United States Patent [19]
Clouston et al.

[11] Patent Number: 5,836,167
[45] Date of Patent: *Nov. 17, 1998

[54] METHOD AND APPARATUS FOR FREEZING LARGE PIPE

[75] Inventors: Stuart D. Clouston, Aberdeen; Paul S. Goodwin, Aberdeenshire, both of Scotland

[73] Assignee: Nowsco Well Service Ltd., Calgary, Canada

[ * ] Notice: This patent issued on a continued prosecution application filed under 37 CFR 1.53(d), and is subject to the twenty year patent term provisions of 35 U.S.C. 154(a)(2).

[21] Appl. No.: 646,372
[22] PCT Filed: Sep. 18, 1995
[86] PCT No.: PCT/US95/11879
   § 371 Date: May 8, 1996
   § 102(e) Date: May 8, 1996
[87] PCT Pub. No.: WO97/11326
   PCT Pub. Date: Mar. 27, 1997
[51] Int. Cl.[6] .......................................... F25D 3/00
[52] U.S. Cl. .................................. 62/66; 62/293
[58] Field of Search ................................ 42/293, 342, 66, 42/340, 457.9

[56] References Cited

U.S. PATENT DOCUMENTS

| 2,483,082 | 9/1949 | Young et al. . |
| 2,566,865 | 9/1951 | Wingerter . |
| 2,572,555 | 10/1951 | Young et al. . |

(List continued on next page.)

FOREIGN PATENT DOCUMENTS

| 0 145 144 B1 | 3/1989 | European Pat. Off. . |
| 361292 | 5/1929 | France . |
| 1199188 | 7/1970 | Germany . |
| 2249817 | of 0000 | United Kingdom . |
| 2 195 738 | 4/1988 | United Kingdom . |
| 2195738 | 4/1988 | United Kingdom . |
| 2206940 | 1/1989 | United Kingdom . |
| 2 301 661 | 11/1996 | United Kingdom . |
| 84/00320 | 9/1984 | WIPO . |
| 86/00277 | 5/1986 | WIPO . |

OTHER PUBLICATIONS

Bowen et al., "Recent Developments in Pipe Freezing," presented at I. Mech. E. Conference in Feb. 1989.
CoPipe Systems Limited, Advertisement brochure, dated 1996 (approximate).
Monk, M.C., "Examincation Report under section 18(3)," U.K. Patent Office, dated Dec. 23, 1997.
Monk, M.C., "Observations under Section 21," U.K. Patent Office, dated Dec. 22, 1997.
Newman & Saunders, "Pipeline Isolation Techniques," Pipeline & Gas Journal, pp. 30–37, 1991.
Shell Standard EM/070, dated Sep. 1993.
Shell Standard EM/071, dated Jan. 1994.
Wigley et al., "Guidelines to Good Practice in Pipe Freezing," dated Jan. 1990, corrected Jun. 1991.
Oil & Gas Journal, Michael J. Nelson, Exxon Co. U.S.A. New Orleans, "Freeze plug proves safe, economical in riser repair". May 1995.

(List continued on next page.)

Primary Examiner—William E. Tapolcai
Attorney, Agent, or Firm—Sue Z. Shaper; Butler & Binion, L.L.P.

[57] ABSTRACT

Apparatus and method for freezing large pipe plugs, including in particular subsea applications, wherein the apparatus includes a jacket adapted to encircle a section of large pipe, a recycling refrigeration unit having said jacket connected as an evaporation chamber and, for subsea applications, a submersible housing enclosing a portion of such refrigeration unit; the method including landing a submersible recycling refrigeration unit on or proximate a pipe and cycling, and preferably reverse cycling, a refrigerant therethrough.

41 Claims, 8 Drawing Sheets

U.S. PATENT DOCUMENTS

| | | | |
|---|---|---|---|
| 2,972,239 | 2/1961 | Vasby | 62/342 |
| 3,041,850 | 7/1962 | Nunn . | |
| 3,196,627 | 7/1965 | Swenson | 62/342 |
| 3,386,495 | 6/1968 | McCurdy et al. . | |
| 3,498,071 | 3/1970 | Tremont . | |
| 3,559,423 | 2/1971 | Scheidler . | |
| 3,623,337 | 11/1971 | Tremont . | |
| 3,695,301 | 10/1972 | Pittman . | |
| 3,742,723 | 7/1973 | Grisé . | |
| 3,827,282 | 8/1974 | Brister . | |
| 3,905,424 | 9/1975 | Elwood et al. . | |
| 3,926,006 | 12/1975 | Brooks et al. . | |
| 4,112,706 | 9/1978 | Brister . | |
| 4,220,012 | 9/1980 | Brister . | |
| 4,224,804 | 9/1980 | Haas | 62/240 |
| 4,267,699 | 5/1981 | Bahrenburg . | |
| 4,309,875 | 1/1982 | Radichio . | |
| 4,314,577 | 2/1982 | Brister . | |
| 4,370,862 | 2/1983 | Brister . | |
| 4,416,118 | 11/1983 | Brister . | |
| 4,428,204 | 1/1984 | Brister . | |
| 4,433,556 | 2/1984 | Brady . | |
| 4,441,328 | 4/1984 | Brister . | |
| 4,463,572 | 8/1984 | Brown, Jr. | 62/342 |
| 4,492,095 | 1/1985 | Brister . | |
| 4,522,041 | 6/1985 | Menzel | 62/342 |
| 4,944,161 | 7/1990 | Van Der Sanden . | |
| 5,016,446 | 5/1991 | Fiedler | 62/342 |
| 5,548,965 | 8/1996 | Chen et al. | 62/293 |

OTHER PUBLICATIONS

Proceedings Of The Institute Of Acoustics, vol. 10, Part 2, p. 681 "An Acoustic Method For Detecting Ice Plug Formation in Cryogenic Pipe Freezing". 1988.

Offshore Engineer Scotland Review, p. 33, Jul. 1994, "Subsea tie–in plays it cool".

University Of Southampton, Department of Mechanical Engineering, Version PD 1, Jan. 1990, "Guidelines to Good Practice in Pipe Freezing".

Nowsco Newsletter Article "Pipe Freeze Achieved on Wellhead" 1995.

PCT International Search Report.

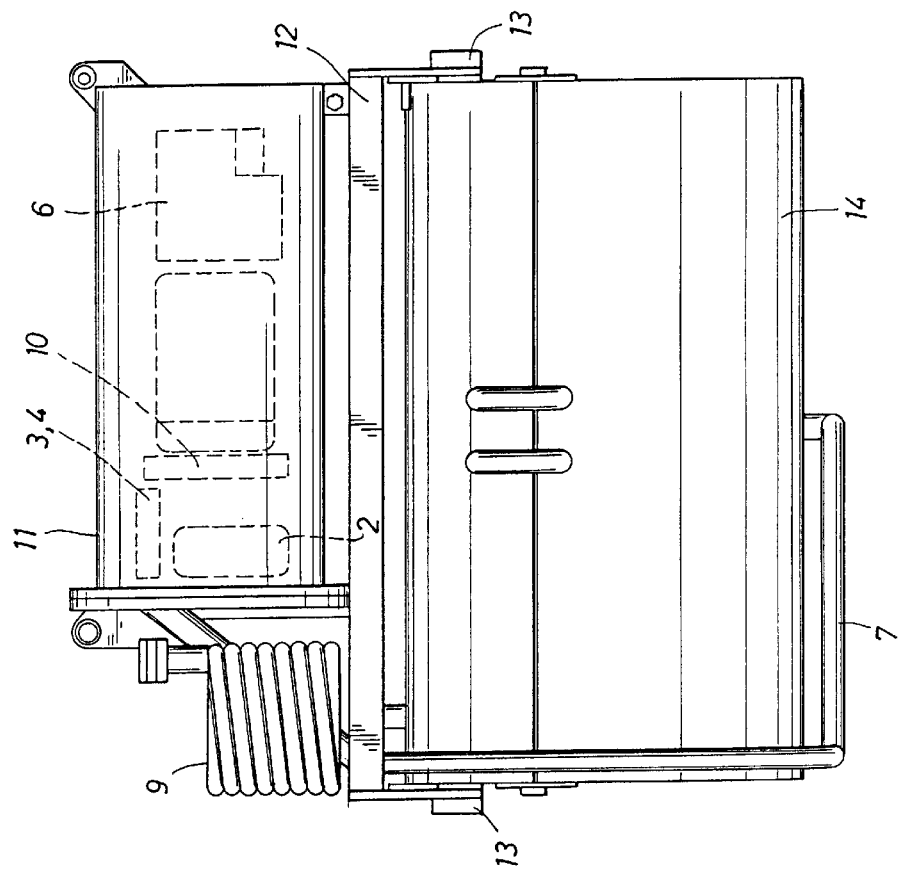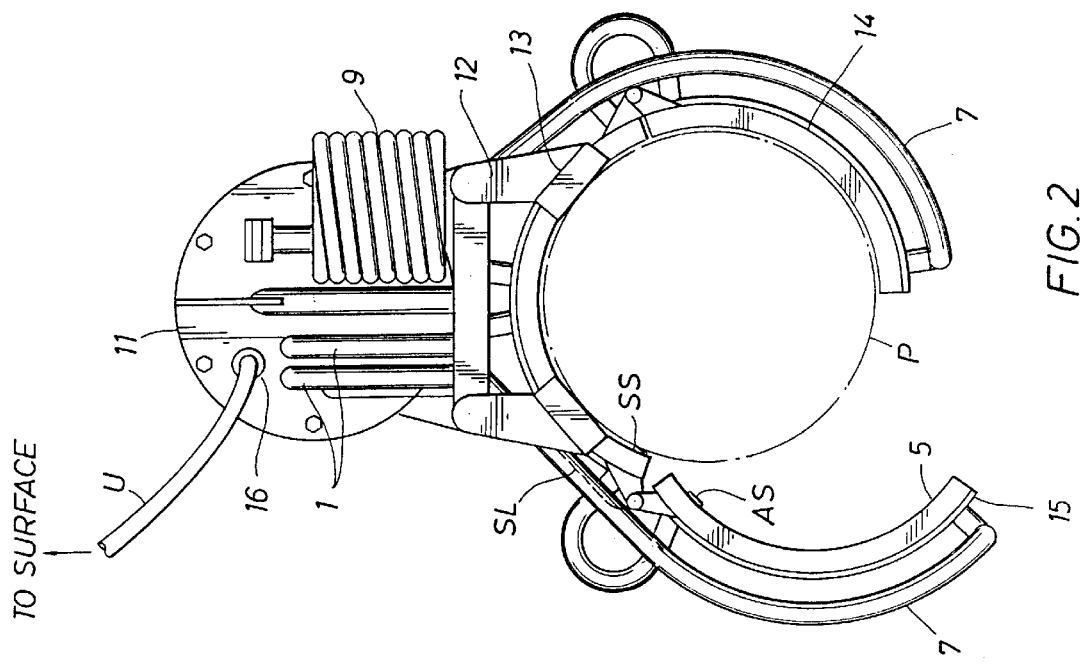

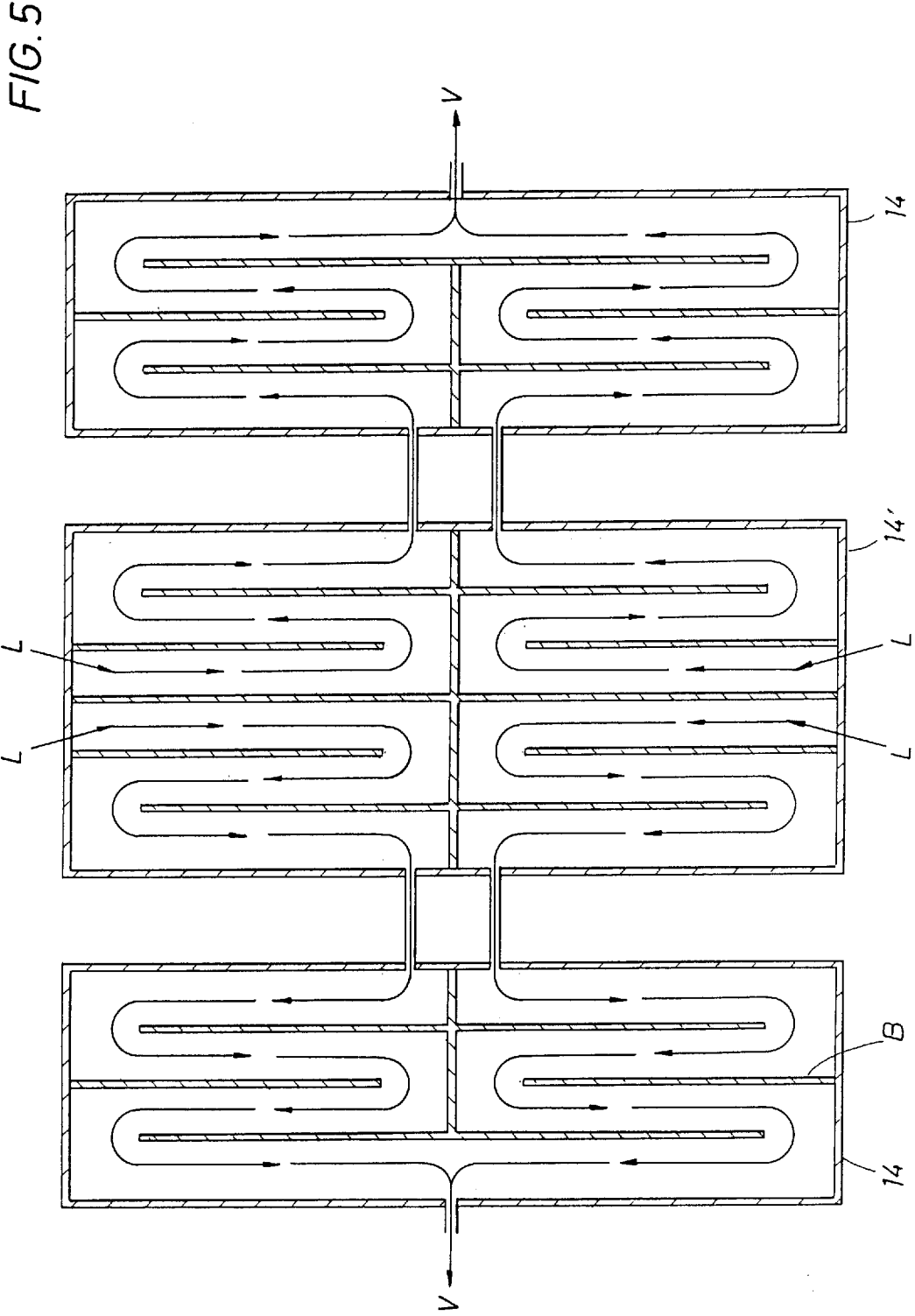

METHOD AND APPARATUS FOR FREEZING LARGE PIPE

FIELD OF THE INVENTION

The field of this invention relates to freezing plugs in pipe, and in particular, to freezing plugs in large and subsea pipe.

BACKGROUND OF INVENTION

Pipe freezing is an established technique for effecting the temporary isolation of a section of a pipe. Fluid in a line, which may include water, oil, hydrocarbons or gel and/or which may involve a strategically placed substance or pig, is frozen by surrounding the pipe with a cooling medium. Current industry practice follows the cryogenic fluid system for performing a pipe freeze. The cryogen typically comprises a liquid nitrogen or carbon dioxide. In the cryogenic system compressed fluids (or solids) at very low temperatures are supplied to a job in tanks, allowed to vaporize to absorb heat and are then vented to the atmosphere. For each job, a sufficient supply of the cryogen, in liquid or solid form, must be on hand to carry out the freeze. Certain cryogenic fluids, such as liquid nitrogen or carbon dioxide, readily meet the needs of vaporizing at very low temperatures and being generally cost effective and transportable. The discharge of these fluids, when consumed, is environmentally acceptable. The bulk of the tanks required to assure an adequate supply of the cryogen at the job, and the care, tending and human supervision required to assure that such tanks remain operational, have not been regarded as imposing unacceptable limitations. Taking into account cost, availability, transportability and time, the cryogenic fluid system has been accepted and adopted as offering the clearly superior cooling system for performing isolated freezes at unpredictable, and possibly remote, locations.

"Guidelines to Good Practice in Pipe Freezing", Version PD 1, January 1990, Corrections June 1991, (C) U. of S. & D. A. W. 1990, c:pt1CvPpip, comprehensively summarized, as of the early 1990's, the state of the art of the technology of pipe freezing. The following quotes from pages 4 and 5 of the document are instructive.

> There are, in principle, many different ways in which the temperature of the pipe and its contents can be reduced to achieve a freeze. For small diameter pipes, freon aerosols have been used by plumbers, but, as the use of freon is now considered an environmental hazard, this practice is now obsolete. Somewhat larger diameters can be handled by the 'Jet-Freezer' type of equipment that uses liquified carbon dioxide. For larger pipes, the most common technique is to attach a jacket to the outside of the pipe and to fill the resultant enclosed space with either liquid nitrogen or a mixture of solid carbon dioxide and a heat-exchange fluid.
>
> Liquid nitrogen is relatively inexpensive, readily available and it is easily transported, stored and transferred to the freezing jacket. Furthermore, its boiling point of 77 K (−196° C.) is far below the temperature required to freeze water and many other fluids and high heat extraction rates are thus possible due to this large degree of supercooling. It is also the only convenient way to obtain temperatures low enough to freeze crude and many refined oils. The circumstances in which the use of liquid nitrogen is essential are listed in the flowsheet, Factors Dictating the Use of Liquid Nitrogen.
>
> However, as noted earlier, many of the pipes to be frozen are made from ferritic steels which are well below their tough-to-brittle transition at the boiling point of liquid nitrogen. Furthermore, the direct impingement of liquid nitrogen on the pipe wall can create large temperature gradients and thermal stresses in the pipe wall. For these and other reasons, it is often necessary to use a different cooling technique, the so-called controlled temperature freeze. The flow sheet entitled Factors to be Considered for Use of a Controlled Temperature Freeze addresses these points.
>
> In a typical controlled temperature freeze an intermediate heat-exchange fluid, such as isopropanol or methanol, is used to surround, and be in contact with, the pipe wall. This fluid is in turn cooled either by the direct addition of solid carbon dioxide, by the controlled supply of liquid nitrogen, or by the circulation of a refrigerant through a coil immersed in the fluid. Cooling times are much longer using this technique, but fine control can be maintained over both the cooling rate and minimum temperature. It is thus the preferred technique for use in suitable applications where possible brittle failure of the pipe is an unacceptable risk. However, as most of these heat-exchange fluids are flammable, their use increases the fire hazard and this risk may not always be acceptable, particularly in sensitive locations. Alternative inert heat-exchange can sometimes be substituted, but they limit the usable temperature range. Recent developments in Remote Coolant Circulation, in which the working fluid is cooled using a heat-exchanger coil and then circulated within the freezing jacket, may offer a viable alternative technique for controlled temperature freezes.
>
> Once the general concept of pipe freezing have been grasped, it is necessary to decide whether is it likely to be possible to carry out a successful freeze under the prevailing circumstances. In all except the most straightforward cases, it is highly desirable for a potential contractor to be able to carry out an on-site survey to establish the relevant details. For freezes on off-shore oil platforms and other complex installations a site survey is essential. The flowsheet, Factors to be Considered to Determine Whether a Particular Freeze Can be Carried Out, addresses many of the points that have to be considered at this stage.
>
> The first, and relatively obvious, point is that there must be reasonable access to the site at which the freeze is to be effected. It must also be possible to bring adequate supplies of cryogen onto the site, to re-supply when necessary and to be able to transfer the cryogen to the point of freeze. In the flowsheet, some of these factors have been given a 'Star' rating to signify their importance. If any of these factors are at their unfavorable bound it is most probably going to be difficult, if not impossible, to achieve a successful freeze.

The above quote makes clear that within the art of pipe freezing there is a distinction between technology suitable for freezing "small diameter" pipes and technology applicable to freezing "larger" pipes. The present invention falls within the art of freezing "large" pipes. The convention is adopted herein, commensurate with general industry understandings, that "large" pipes comprise pipes of 6" outside diameter and up. Such pipes may well have an outside diameter ("OD") of 30" or 40" or more.

The above quote also illustrates that as of the early 1990's the industry practiced some variation of the cryogenic fluid system for freezing "large" pipes.

"Subsea" pipe freezing forms a relatively new arena and area of expertise. The first subsea pipe freeze experiments and research appear to have surfaced in the mid- to late 1980's. Of the only two known and reported successful commercial subsea pipe freezes, both utilized cryogenic fluids systems. One successful freeze was reported in the Offshore Engineer Scotland Report of July, 1994 and published by presentation and handout at the Society for Underwater Technology Conference at Thainstone, Scotland at the end of the summer of 1994 (herein incorporated by reference). The other successful freeze was published in "Technology" and was based on a presentation to the Energy and Environmental Expo 1995, Houston, January 29–February 1. In each case, the cryogenic fluid tanks themselves were located on the surface vessel, with insulated hoses used to pump the "cooling medium" from the vessel to a jacket located around the subsea pipe. Hoses also returned the cooling medium to the surface. "Consumed" cryogenic fluid was released to the atmosphere. The "cooling medium" comprised either the cryogen itself or a secondary coolant working fluid that was circulated through a heat exchanger on the vessel in cooling contact with the cryogen.

The source of cooling power in large pipe freezes has historically been located where it is readily accessible for human handling and management. In particular, cryogenic fluid tanks require a significant amount of constant human attention and handling to keep them operational.

In contrast to industry practice, the present invention teaches away from the cryogenic fluid system, and in particular, away from the extensive use of insulated hoses. The method and apparatus herein disclosed for freezing large pipes, including subsea applications, is founded, in fact, upon subsea experience.

A plug must be maintained frozen during the period of pipe modification and repair. Loss of a plug after the pipe has been cut could be hazardous. Insulated hoses for the transport of the cooling medium can sustain only a limited amount of flexing without danger of fatigue or over stressing under tension, due to ice build-up from the cryogen. Therefore, rough weather could require a vessel to pull off all hoses transporting a cooling medium to a subsea pipe freeze to avoid loosing hose integrity. If pulling off were required after the pipe was cut, the potential is raised that the plug and a pipeline of fluid could be lost before insulated hoses could be reattached in calmer weather.

The inventors have determined, based upon the above considerations, among others, that the better practice in pipe freezing adopts a cooling methodology wherein (1) the source of cooling power is stationed "proximate" to the section of pipe to be frozen. This method avoids the necessity for maintaining extensive insulated hoses transporting a cooling medium and the limitations and dangers such hoses impose, especially in a subsea environment. "Proximate" will be used somewhat arbitrarily herein to mean at least within about twenty feet. Ten feet or less would be preferable. Ten feet or less will be referred to herein as "adjacent". The above teaching implies that if the pipe is subsea, the source of cooling power should be stationed subsea.

It can be added that, not only may insulated hoses transporting refrigerant from the surface to a sea bed present unacceptable environmental risks, they present occupational safety issues and possibly prohibitive costs as well. If the realistic ability to ensure the integrity of insulated hoses throughout the time of a subsea pipe freeze is inadequate, then the whole operation may be jeopardized. Further, such hoses are expensive and their capacity to be reused from job to job is doubtful, due to the complex loading experienced in offshore operations. Inability to reuse insulated hoses significantly raises their costs. The hoses must be regarded as "consumed" with each job.

The present invention, therefore, teaches accepting, as a limitation, the avoidance of transporting refrigerant through insulated hoses over significant distances, and in particular, from surface to subsea. Accepting such a limitation has led the inventors to teach placing the source of refrigerating power adjacent to, or proximate to, the section of pipe to be frozen, including on the sea bed or on the subsea pipe, when applicable.

A second aspect of divergent methodology taught by the present invention follows the acceptance of the above limitation, namely that the source of refrigeration should be placed proximate to pipe. Acceptance of that first limitation has led the inventors to rethink and reject the industry standard cryogenic fluid system. The present invention also teaches, therefore, what might appear to the industry initially as improbable, namely, (2) the use of a recycling refrigeration system for large pipe freezes, including subsea pipe freezes. Use of a recycling refrigeration unit eliminates the use of cryogen tanks and the venting of used gases.

As an associated innovative aspect, the present invention further teaches (3) using the encircling pipe jacket itself for the evaporation chamber of the refrigeration unit. Such design enhances cooling efficiency and distribution without sacrificing temperature control. Such design eliminates the inefficiency and complications associated with use of secondary "working" fluids in order to perform a "controlled temperature" freeze.

At least for large pipe freezes, the concept of (1) using a recycling refrigeration unit with (2) the jacket encircling the pipe configured as the unit's evaporation chamber, as well as the concept of (3) stationing such cooling unit proximate the pipe subsea, is not within the teaching of the industry. This is abundantly clear as of the early 1990's from the "Good Practices in Pipe Freezing" document.

The present applicant itself performed one of the two above reported known and commercially successful pipe freezes. (The North Sea freeze—see document incorporated by reference). As of the beginning of 1994, it is clear that the applicant itself did not conceive of the need for, nor the value of, nor the possibility of, the method and apparatus comprising the present invention.

Brister, in U.S. Pat. No. 4,441,328, may have appreciated the value of avoiding the use of extensive insulated hoses running subsea for large pipe freezes. Brister suggests the possibility of locating a cryogenic fluid system in a seabed habitat, or upon a submersible platform. A habitat, however, of a size and scope where humans could maintain the cryogenic tanks in working order, (clearly suggested by Brister because cryogenic tanks require a large amount of care and tending,) involves such expense and logistics as to render Brister's suggestion impractical. Over a several day operation many tanks would need to be changed out and used. Likewise, submersing cryogenic tanks without ready human supervision in a subsea environment is impractical.

The present invention, in addition, includes second and third aspects, e.g. a recycling refrigeration unit with the jacket as evaporator, that were not at all taught, suggested or appreciated by Brister. It has been commonly believed that sufficient cooling power to effect a timely freeze in a large pipe required the high cooling power of a cryogenic fluid system. The disclosure of a sufficiently mobile yet powerful recycling refrigeration unit design is unanticipated. Part of the refrigeration unit design avoids the inefficiency of "secondary working fluids" for performing "controlled freezes" by incorporating the pipe jacket as the evaporative chamber, a point also unappreciated and untaught by Brister.

One patent and two applications, one application perhaps never filed and still secret, have been identified that teach the use of a recycling refrigeration system in connection with pipe freezing. The one patent, Radichio, not surprisingly, dates back to the 1970's, before industry had accepted and adopted the superiority of the cryogenic fluid system.

None of these documents teach or suggest the capacity of locating a recycling refrigeration unit subsea. None of the documents address how the refrigeration unit is physically connected to the jacket or the subject matter of extensive insulated hosing. None of the documents teach a refrigeration unit design wherein an encircling pipe jacket suitable for large pipe freezes forms the evaporative chamber and thereby avoids the inefficiency of using a secondary working fluid, without loss of a "controlled" freeze.

A German Patent application paper or draft (filing information unknown) that has come to hand discloses a topside recycling refrigeration system that requires, and calls for, a secondary working fluid to be piped to the jacket. Among other points, the application does not appreciate the possibility of the design, nor the efficiency nor control that is possible with, implementing the pipe jacket as the evaporative chamber.

Radichio, in U.S. Pat. No. 4,309,875, first of all, does not appear to address the problems inherent in the "large" pipe freeze art. One of skill in the art would understand Radichio as dealing with small pipe and low pressure problems in a topside scenario. Radichio does not conceive of, teach or suggest performing a pipe freeze utilizing a jacket for encircling a pipe as the evaporative chamber. Radichio teaches a cradle evaporative chamber. The cradle is taught to never come in contact with the pipe. Like the German application, a secondary cooling medium is always interspersed between the cooling cradle and the pipe. The plug formed from Radichio's cradle would be asymmetrical. Supplying sufficient cooling power while minimizing the size of the refrigeration unit and producing a sufficiently low pipe surface temperature to freeze a plug capable of withstanding substantial pressure are clearly not issues of concern for the Radichio design. Freezing a line by means of a cradle would not optimize or economize the cooling power expended. Radichio shows neither motivation to, nor capability to, solve the issue of optimal evaporative chamber design for large pipe freezes. Clearly, for large pipes it is unlikely that a cradle system could provide sufficient cooling power to close the plug.

The Mark/Shell Patent Application GB 2 195 738 A suggests that jackets encircling the pipe might be provided with a cooling circuit which might consist of a self-contained compressor driven refrigeration system. The published Application, subsequently abandoned, contains no illustration nor reduction to practice. The Shell document is ambiguous or silent as to whether a secondary cooling agent is intended and/or whether extensive insulated hoses are necessary. It does not teach or suggest landing a refrigeration unit, or any cooling unit, proximate the pipe.

SUMMARY OF THE INVENTION

The invention comprises apparatus for freezing plugs in large pipes, including subsea pipes. The apparatus includes a jacket adapted to encircle a section of large diameter pipe. A recycling refrigeration unit is connected to the jacket, preferably located proximate the jacket, and incorporates the jacket as an evaporation chamber. For subsea environments a subsea submersible housing encloses a portion of the refrigeration unit, and the housing may be attached to the pipe.

The large pipe is anticipated to comprise pipe of outside diameter between 10 and 50 inches. Preferably, the jacket has a length of at least one and one half times the pipe outside diameter and defines within it a baffled interior fluid passageway.

In preferred subsea embodiments the condenser is attached outside of the submersible housing and the refrigeration unit includes means for reversing its cycle to heat the jacket. It is anticipated that seawater will infiltrate and occupy at least portions of space between the jacket and pipe when attached to the pipe. In some embodiments the refrigeration unit includes a single stage rotary compressor and a sub-cooling cycle.

The method for freezing a large pipe plug includes surrounding a portion of large pipe with a jacket wherein the jacket comprises an evaporation chamber for a proximately located recycling refrigeration unit. Refrigerant is cycled through the unit and the jacket. Preferably, means exist for reversing the cycling of the refrigerant to the unit and the jacket. In subsea environments the method includes landing a recycling refrigeration unit under seawater proximate a portion of pipe, and preferably attaching the unit to the pipe.

BRIEF DESCRIPTION OF THE DRAWINGS

A better understanding of the present invention can be obtained when the following detailed description of the preferred embodiment is considered in conjunction with the following drawings, in which:

FIG. 2 illustrates a preferred embodiment for a subsea refrigeration system, the illustration providing an end elevational view.

FIG. 3 provides a side elevational illustration of the embodiment of FIG. 2.

FIG. 5 illustrates structure and flow within an evaporator jacket.

DETAILED DESCRIPTION OF THE PREFERRED EMBODIMENTS

Figure 1:
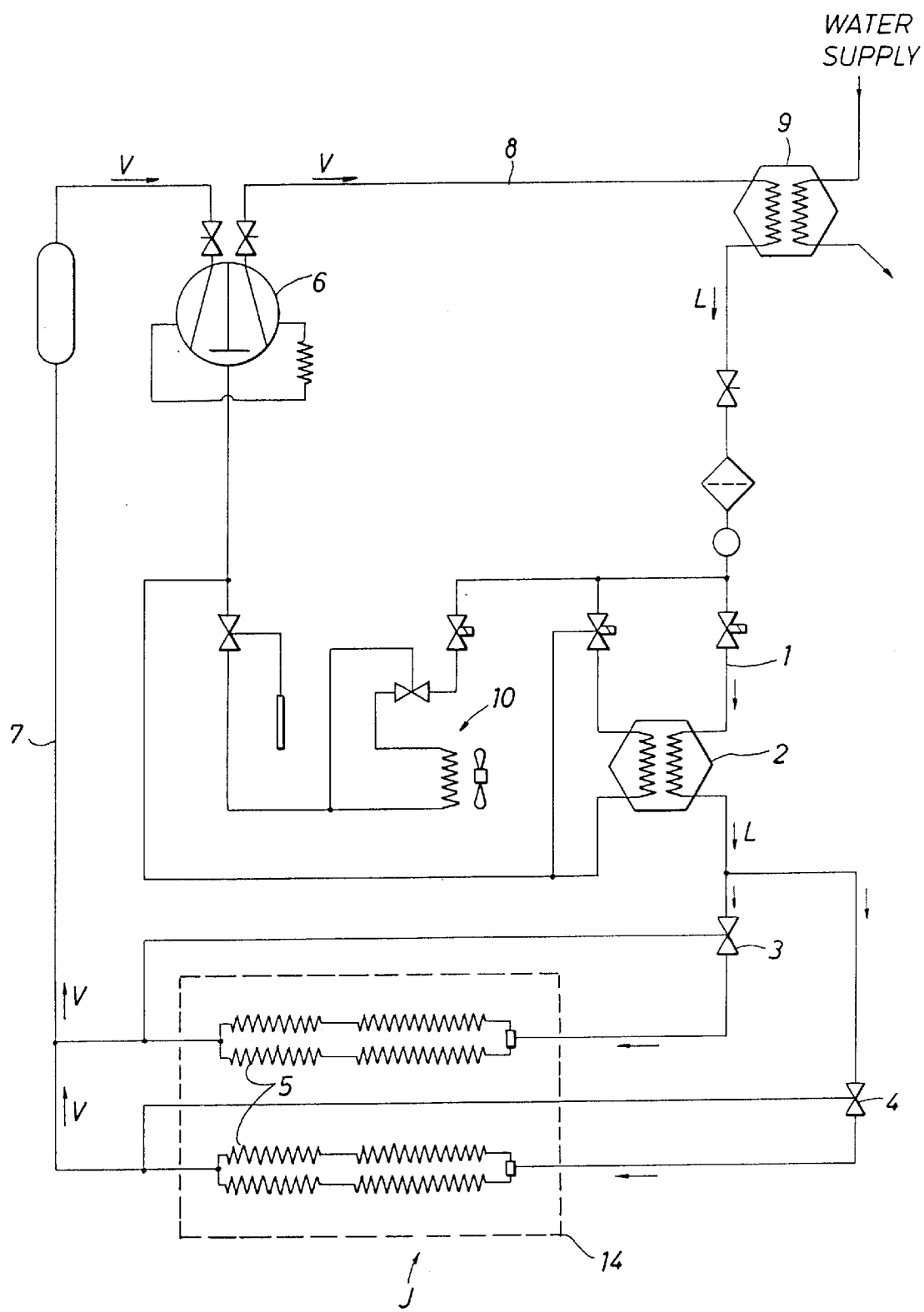
FIG. 1 provides a process schematic for a preferred embodiment for a refrigeration system of the present invention.

This invention relates to the formation of a temporary isolation in a subsea, topside or on-land pipeline system used to transport products including oil, gas and water. The method described comprises a novel version of a pipe freezing technique where a liquid such as water, oil or gel is frozen within a pipe to form a plug.

Traditionally, large pipe freezing has been performed using methods where a fabricated enclosure or jacket is placed around a pipe to form a chamber through which a cryogenic liquid, generally liquid nitrogen, is pumped to cool down the surface of the pipe and ultimately form a frozen plug within the pipeline. This technique has been demonstrated both in air and subsea environments and has been further extended to allow freezing at controlled temperatures by using a heat exchanger to pre-cool a working fluid refrigerant which is then itself circulated around a jacket. All known subsea freezes have required the utilization of significant lengths of insulated hoses for transporting a cooling medium from the surface to the subsea pipe.

The present invention provides a new method for the formation of ice-plugs in large pipeline systems to allow, for instance, intervention in the pipeline for the purpose of repair or modifications. It is recognized in such cases that the ice plug must form and hold, against pipeline and ambient pressure, a temporary barrier against loss of line product and, in the case of subsea pipeline, ingress of sea water.

The novel method and apparatus of the present invention involves the use of a potentially remotely controlled but proximately located recycling refrigerator system where the evaporating chamber of the system is constructed in such a way as to encompass the pipeline at the designated area. Such an encompassing chamber may be referred to as a jacket.

The system is suitable for use both subsea and on the surface. In the case of subsea operation, the refrigeration unit is fully submersible to the seabed. Control of the submerged refrigerator system is preferably provided from the surface, e.g. from a vessel or platform or possibly a submersible unit, via a control umbilical which can provide power, communication and monitoring between the freezing system and the surface. A flexible umbilical system can tolerate substantial vessel heave in bad weather conditions.

For surface or topside application of the system, the refrigerator is man portable to facilitate equipment set up.

The invention provides a system for forming ice plugs in large diameter pipeline systems, or in a pipe of six inches outside diameter and larger. The plug is formed in a liquid, which may comprise the line product, an alternative liquid injected into the pipeline such as gel, or a slug of liquid which has been displaced through the pipeline to a predetermined position. Both formation of the plug and control of the equipment and monitoring is possible from a location remote from the freeze site.

The system is based primarily on a recycling refrigerator that is suitable for both subsea and surface use. The principle of operation of the unit, whether subsea or surface, is the same. The housing and the configuration of the system may be specific to the application.

FIG. 1 shows a schematic of the principal components of a refrigeration system in accordance with the present invention. High pressure, high temperature liquid refrigerant L flows through liquid line 1 to a sub cooler 2, which preferably, in some designs, pre-cools the liquid refrigerant to increase the efficiency of the system. A sub cooler is optimally employed with a single stage compressor. If a specific site application permitted, a multiple stage compressor might be preferred.

It might be mentioned that in order to improve the performance of some types of vapor compression refrigeration systems, especially with a single stage or rotary compressor, it is a common practice to pre cool the refrigerant liquid prior to injection into the evaporator. This can be accomplished in several ways. In one preferred embodiment of the subsea system a direct expansion heat exchanger is used, e.g. sub cooler 2. The principle advantage of sub cooling is, in effect, to reduce the mass flow of the refrigerant through the evaporator per unit of heat extraction. This is due to the reduction of "flash gas" (refrigerant evaporating to cool remaining liquid refrigerant to the evaporator saturation temperature) at the refrigerant control device.

Subsequent to subcooler 2, liquid L flows to refrigerant flow control valves 3 and 4, which may be thermostatically or electrically controlled. As the liquid passes through the control valves, the pressure is reduced to that of the evaporator 5 so that the saturation temperature of the refrigerant entering the evaporator will be below the temperature of the refrigerated item i.e. the pipe. In the preferred embodiment illustrated evaporator 14 is incorporated into jacket J. Part of the liquid vaporizes as it passes through the flow control valves in order to reduce the temperature of the remaining liquid to the evaporating temperature. In the evaporator the liquid vaporizes at constant pressure and temperature as heat (to supply the latent heat of the vaporization) passes from the pipe, through the evaporator walls and to the vaporizing liquid. By action of a motor driven rotary compressor 6, vapor V resulting from vaporization is drawn from the evaporator, through suction line 7, and into the suction inlet of the compressor. Vapor V leaving the evaporator is saturated, and its pressure and the temperature are those of the vaporizing liquid.

In the compressor the temperature and pressure of the vapor are raised by compression and the high temperature, high pressure vapor is discharged from the compressor into discharge line 8. The vapor flows through the discharge line into coaxial condenser 9 where it gives up its heat to the condensing media. As the hot vapor gives up heat, its temperature is reduced to the saturation temperature corresponding to the discharge pressure, and vapor condenses back to liquid as further heat is removed. By the time the refrigerant leaves the condenser all the vapor is condensed back into the liquid phase. The liquid L is then re-circulated. A motor cooling system 10 may also be included to reduce the ambient temperature of the refrigerator system housing, or enclosure, if required. Such requirement is more likely, for example, in warm Gulf of Mexico waters than in cool North Sea waters.

The refrigeration system above described preferably can be designed and run in a heat pump mode (reverse cycle), as is known by those in the art, in order to provide the capacity to heat the jacket for rapid thawing of the ice-plug and/or for removal of the system from the pipe upon completion of an operation. Alternatively, electrical heaters may be incorporated on the jacket assembly (not shown) for the same purpose.

In the case of a subsea system (see FIGS. 2, 3 and 4) the refrigerator plant, i.e. the motor, compressor, subcooler, motor cooler, and valving, are enclosed in a pressure vessel or enclosure 11, alternately referred to as a housing or subsea pod, for submersion to water depths up to and in excess of 300 m without ingress of water. The enclosure may be fixed to a support frame or saddle 12 which supports the full weight of the system and attaches to and transfers the load through buffer blocks 13 directly to the pipe. Straps or other securing devices suitable for operation by divers or a Remotely Operated Vehicle (ROV) may be used to attach the refrigerator system to the pipeline. The evaporator 14 forms, or forms part of, the pipe jacket J and may be split into segments, typically three, a top section and two hinged side sections. The evaporator may be further split into a number of circuits to ensure good distribution of refrigerant and even cooling (see FIGS. 4 & 5). Non-collapsible insulation 15, such as vinyl insulation, is preferably attached to the outside of the evaporator to minimize heat gain to the freeze area from the surrounding water.

The jacket assembly can incorporate instrumentation to monitor the pipewall temperature, jacket temperature and an ice plug closure detection system which may be an acoustic based system. Models predicting the growth and condition of the plug can be developed based upon acoustic sampling adjacent a freeze jacket.

The refrigerator system can include hydraulic actuators to facilitate jacket installation and can be designed in such a way as to facilitate installation by both diver or ROV.

The condenser 9, FIGS. 2 and 3, in a subsea system may be located on the outside of the enclosure, and thus submerged in water. Cooling can optimally be provided from the surface by pumping water down a flexible hose to such condenser and dumping the heated water subsea. Alternatively, using an alternate condenser design, heat could be dumped directly to the surrounding sea water without the requirement for a water supply from the surface.

The compressor drive motor could be driven by 3-phase electrical supply from a surface vessel or platform. Back up submerged batteries, including subsea batteries, can be provided in case of the necessity of pulling off a surface vessel in bad weather. Such batteries could maintain a frozen plug during the workover operation.

A multicore umbilical preferably would be run from the surface to the subsea refrigerator system to provide both power, control and instrumentation lines. Remote control of the system could include start up and shut down of the refrigerator, motor speed adjustment and valve actuation. In addition to jacket and pipewall instrumentation, temperature and pressure monitoring of the system can be provided via the same umbilical. The umbilical itself can incorporate a wet-mateable connector 16 to allow for umbilical replacement subsea in the event of failure, and would be designed to be flexible to allow for vessel heave, even in extreme weather conditions.

Alternatively a hydraulic motor could be used to drive the compressor. In this case, the exhaust from the motor could provide a condensing media.

On the surface, a control unit can be employed to operate and monitor the deployed refrigerator system. A data logging system may also record all instrumentation data throughout the whole operation. The control unit may also operate, optionally, as a "closed-loop" system where no operator input is required to control the cool down or the maintenance of the pipe during freeze. Software control could not only, for example, in conjunction with the refrigeration unit of the present design, maintain the pipewall at a specified temperature but could also monitor various parameters within the operating unit to allow automatic control of housing environment temperature and refrigerant sub-cooling.

Figure 6:
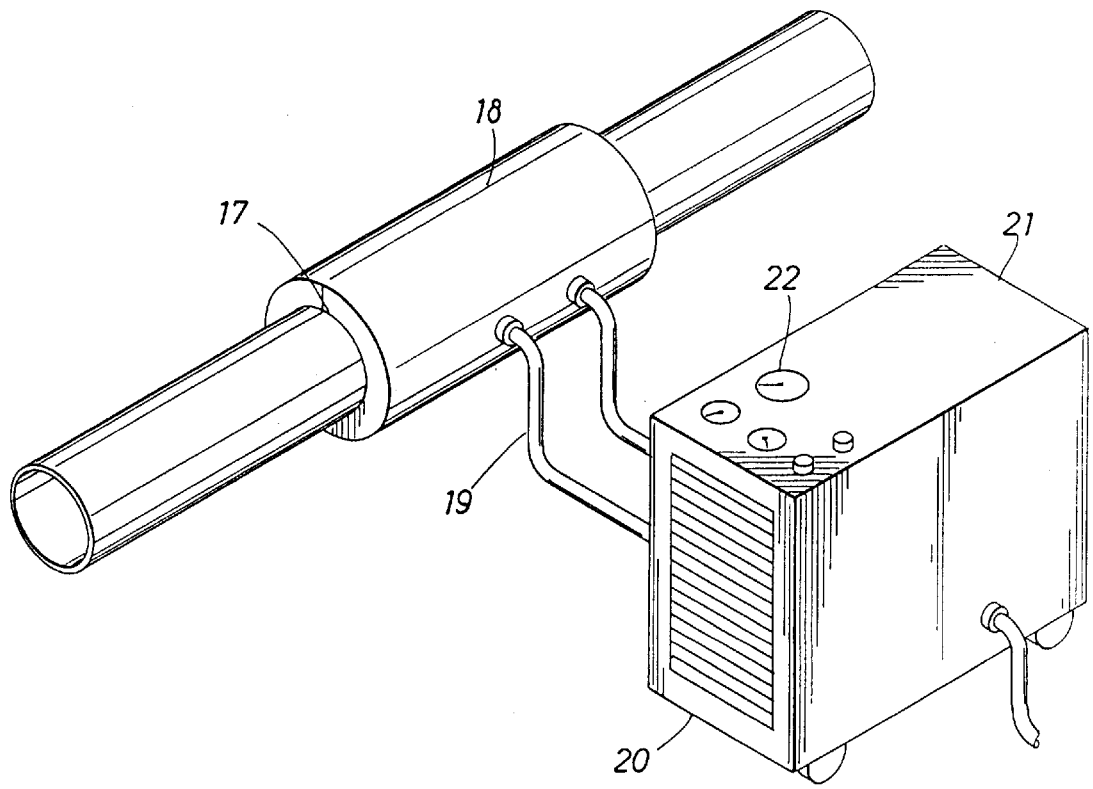
FIG. 6 illustrates a preferred embodiment for a surface refrigeration system of the present invention.

For surface or topside use the refrigerator would in most cases be located off the pipe (see FIG. 6). Generally, it would not be practical, due to space restriction, to mount the refrigeration system directly onto the pipe. However, the refrigeration unit of the present design is sufficiently compact and mobile as to be allowed to be placed proximate the pipe to be frozen in even those locations where space is scarce, such as in plants and offshore platforms and on vessels.

The top side unit evaporator 17 would again be designed to encompass the pipeline. For smaller diameter "large" pipe such evaporation design might comprise a single flexible piece which could accommodate a range of pipe sizes. For larger "large" pipe sizes the evaporator would preferably comprise multiple segments, as illustrated in the subsea system.

With the subsea system, a thin layer of ice is expected to form between at least portions of the evaporator jacket and the pipe. Although the jacket is preferably designed to closely encompass a pipe, jacket design will allow for variation in actual pipe diameter in practice. Thus, portions of the jacket may directly contact the pipe and other portions may not, but means for securing good thermal contact can be provided to accommodate these pipe size variations. Ice filling the space between the jacket and the pipe forms one means of supplying a good conductive heat path. In the case of a surface system, where the pipe is surrounded by air a heat transfer contact compound might be provided. As a further topside alternative, a chamber could be attached around the evaporator itself to allow submersion of the jacket in a liquid such as water. After installation of the evaporator, preferably an insulation 18 is fitted adjacent the jacket to prevent heat transfer from the environment to the freeze area.

Whereas with a subsea system it is desirable for suction and discharge lines to a jacket to be hard-piped, with a surface unit it is more practical for suction and discharge lines 19 to be flexible. For larger pipe diameters, separate suction and discharge lines would be used. For smaller pipe diameters, where the volume of refrigerant is comparatively small, a single coaxial flowline could be used for both suction and discharge.

The suction and discharge lines, or coaxial suction and discharge line, of the refrigeration unit may be fitted with connectors to allow for disconnection of the evaporator in order to design for large variations in pipe diameter freezes with a single refrigeration unit. Such key elements and system make-up for a surface unit could be essentially the same as those described for a subsea system. However, an air/gas cooled condensing unit 20 may be preferable topside, as an alternative to a liquid cooled unit, and either a single stage rotary or multi-stage compressor might be used topside.

The drive motor for a compressor could be either electrically, pneumatically or hydraulically driven. The topside surface unit housing (or enclosure) 21 could contain all of the refrigerator system components with the exception of the evaporator.

The topside housing is designed such that it is light and can be man-handled in areas of restricted access, such as offshore platforms and industrial plants and vessels.

The instrumentation on the topside system would provide similar operating and monitoring capabilities as with the subsea system. The topside housing could accommodate data readouts, including motor speed, section and discharge temperatures, pipewall temperature and other critical parameters to allow a determination of the refrigerator system performance. An interface to allow external data logging/recording could be incorporated. The control system on the refrigerator unit may also operate as a closed-loop system where no operator input is required to control the cool-down and maintenance of the pipe during the freeze.

The possible advantages of the system of the present invention, for both a subsea and surface environment, can be summarized as follows:

Subsea Unit
1. Elimination of significant insulated hoses exposed to environment and vessel heave.
2. Elimination of lengthy equipment set-up time.
3. Elimination of need to perform lengthy drying/purging of insulated hoses and jacket following subsea installation to pipe.

4. Vast reduction in cost of consumables, such as cryogenic fluid and insulated hoses.
5. Significant reduction in quantity of equipment and space requirements.
6. Minimization of need for equipment operators.
7. More reliable:
   less components (less moving parts).
   less chance of operator error.
8. Little operator input required. Prior art systems require continual operator control.
9. Better control over pipewall temperature.
10. Option to speed up thaw time by using reverse cycle or heaters.
11. Reduction in overall time to perform freeze.

Surface System
1. Reduction in equipment set-up time.
2. Equipment man portable.
3. Reduction of hoses running in work areas.
4. Size of equipment allows it to be sited proximate the freeze location.
5. No consumables, so reduction in cost.
6. Significant reduction in area required by equipment
7. No need to purge/dry equipment.
8. Reduction in number of operators.
9. Little operator input required.
10. Better control over pipewall temperature.
11. Option to speed up thaw time by using reverse cycle or heaters.
12. Reduction in overall time to perform freeze.

Figure 7:
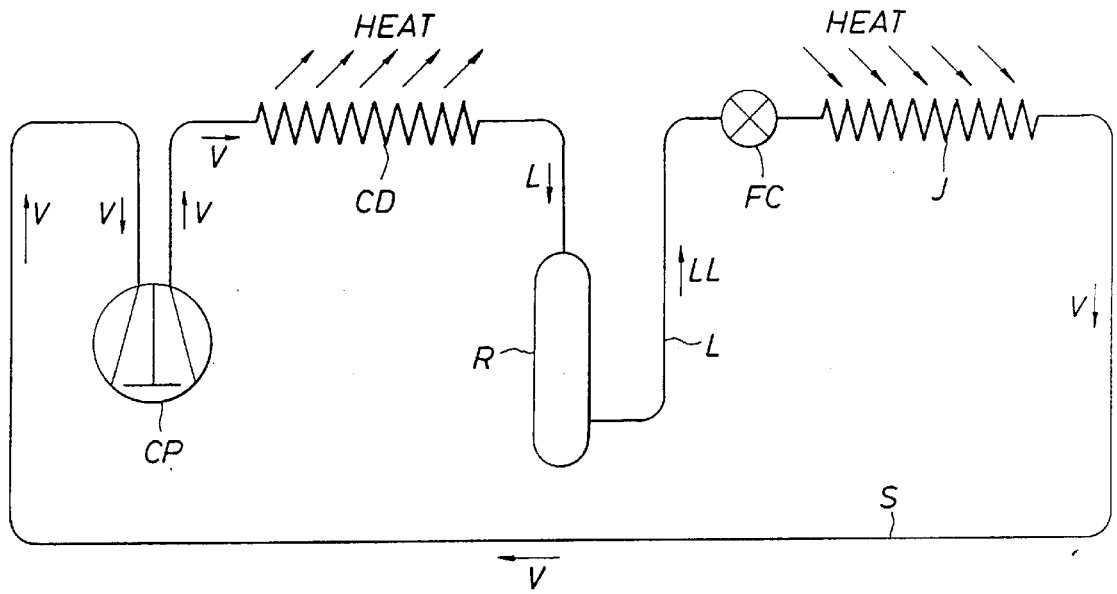
FIG. 7 comprises a diagram of a simplified vapor compression refrigeration system.

A diagram of a simplified vapor compression refrigeration system is shown in FIG. 7, wherein the evaporation unit comprises a jacket whose temperature can be controlled. The principle parts of the system comprise an evaporator pipe jacket J, whose function it is to provide heat transfer service through which heat can pass from the refrigerated item into the vaporizing refrigerant. A suction line S conveys the low pressure vapor V from the evaporator J to the compressor CP inlet. A vapor compressor, whose function it is to remove the vapor from the evaporator and to raise the pressure and temperature of the vapor to the point where it can be condensed with normally available condensing media is connected to the suction line. A discharge line D delivers high pressure, high temperature vapor V from the discharge of the compressor CP to the condenser CD. Condenser CD provides a heat transfer surface through which heat passes from the hot refrigerant vapor to the condensing media. A receiver tank R provides storage for condensed liquid refrigerant L. A liquid line LL carries liquid refrigerant from the receiver R to the refrigerant flow control FC. A refrigerant flow control meters the proper amount of refrigerant to the compressor to reduce the pressure of the liquid entering the evaporator so that liquid will vaporize in the evaporator at the desired low temperature. The unit will be designed and scaled, including the selection of the refrigerant, to operate within a jacket temperature range. The proper jacket temperature range will be selected in accordance with the lower limit to which the pipe temperature can be safely reduced.

Such a refrigeration system can be conceptually divided into two parts according to the pressure exerted by the refrigerant in the two parts. The low pressure part of the system consists of the refrigerant flow control, the evaporator, and the suction line. The pressure exerted by the refrigerant in these parts is the low pressure under which the refrigerant is vaporizing in the evaporation. This pressure is known variously as the "low side pressure", the "evaporator pressure", the "suction pressure", or the "back pressure". The high pressure side of the system consists of the compressor, the discharge line, the condenser, the receiver, and the liquid line. The pressure exerted by the refrigerant in this part of the system is the high pressure under which the refrigerant is condensing in the condenser. This pressure is called the "condensing pressure", the "discharge pressure" or the "head pressure". The dividing points between the high and low pressure sides of the system are the refrigerant flow control, where the pressure of the refrigerant is reduced from the condensing pressure to the vaporizing pressure, and the discharge valves in the compressor, through which high pressure vapor is exhausted after compression.

Figure 8:
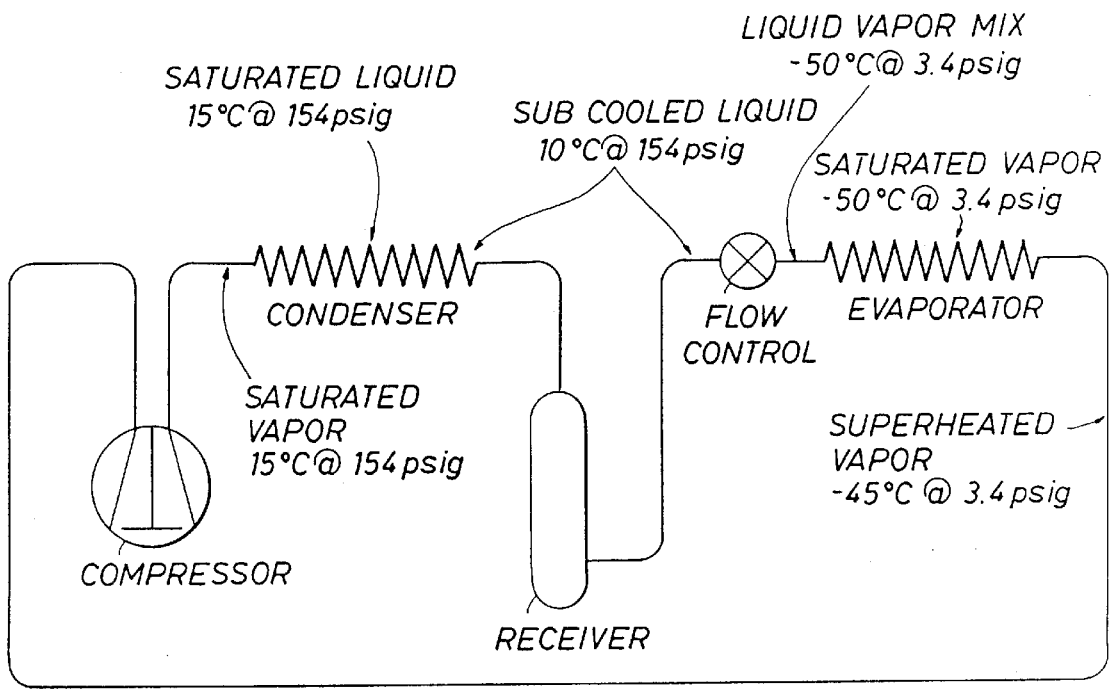
FIG. 8 comprises a diagram as in FIG. 7 but including rough estimates of ideal pressures and temperatures.

Roughly estimated pressures and temperatures relating to a basic vapor compression refrigeration system are shown on FIG. 8. Such roughly estimated pressures and temperatures are "ideal". Pressure drops within the lines or heat exchanges are not considered. In actual systems such pressure drops can be substantial.

Figure 9A:
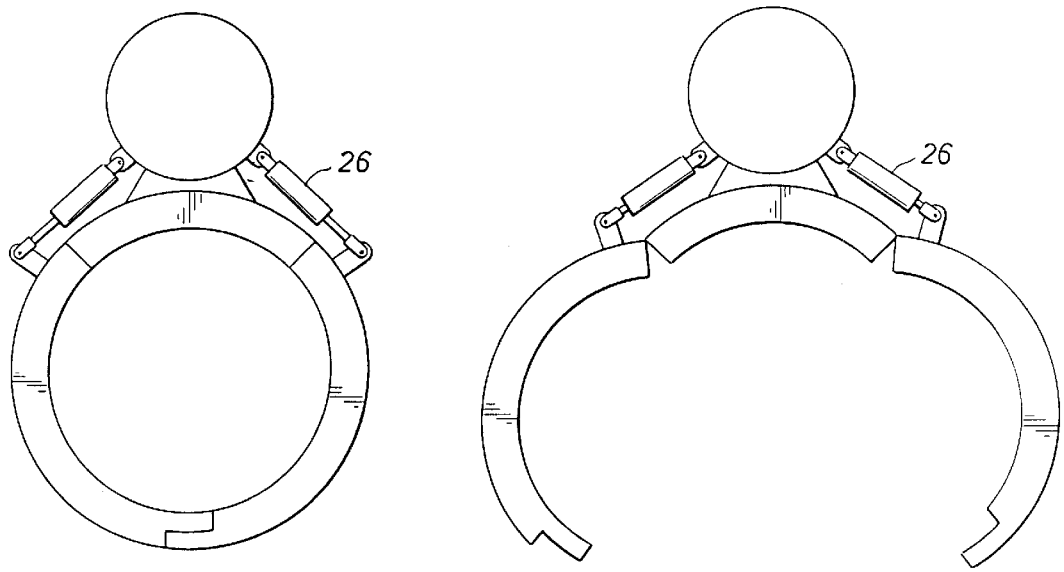
FIG. 9 comprises an end elevation schematics of an evaporator jacket, illustrating hydraulic actuators.
Figure 9B:
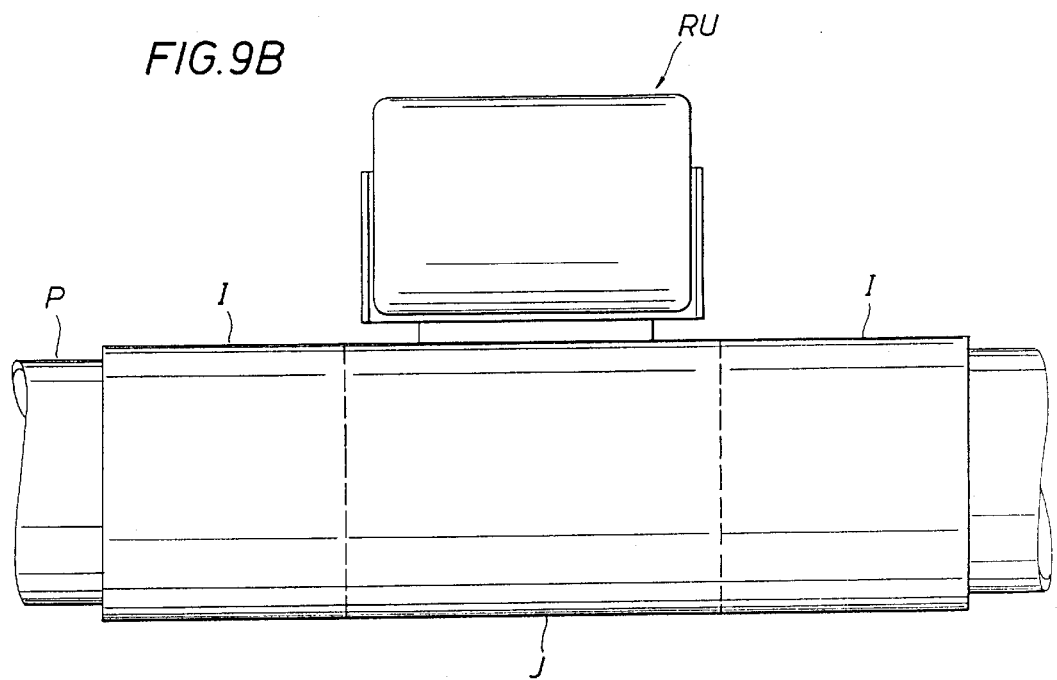

Additional control and subsystems can enhance the performance and operating range of the simplified system illustrated above, and may be incorporated into preferred embodiments of the present invention. Such additional controls and subsystems include the design of an evaporator which forms part of the pipe jacket. For larger pipe, this evaporator is preferably split into three pieces, a top section and two hinged side sections. See FIG. 9. The evaporator may be further split, in a preferred embodiment, into four circuits to insure more even distribution of the refrigerant. Two suction lines can be used to convey gas from each evaporator side section.

A single stage rotary vane compressor may optimally be selected for some preferred embodiments, taking into account refrigeration unit size limitations and the limitations upon the temperature to which the pipe can be safely reduced. Such a compressor has an additional inlet commonly known as an economizer port 25. See FIG. 10. The economizer port comprises effectively an intermediate pressure port. This intermediate pressure port is a port where additional gas can be introduced into the compressor part way through the compression cycle. Such offers the advantage that, in some respects, the compressor behaves like a two stage machine. The feature can be used to provide additional subcooling to the refrigerant liquid, enhancing system performance.

Preferred embodiments may further include a discharge line, a water cooled coaxial condenser and a receiver which in some field versions may be omitted, as the condenser tube size volume could be selected so as to act both as condenser and receiver. A liquid line and four refrigerant flow controls are preferably included, two controls for the jacket, one control for the subcoolant and one for the motor cooling system. Automatic thermostatically controlled valves may be utilized. The jacket valves may be replaced with electronic valves in some embodiments.

A subcooler may comprise a plate type heat exchanger that can be used to reduce the temperature of the liquid refrigerant prior to introduction into the evaporator. Use of a subcooler has the effect of refining mass flow through the evaporator for given evaporator duty. An optional motor cooling system comprises a small evaporator, expansion valve and temperature regulator. The compressor drive motor may include a small impeller attached to the drive shaft. The drive shaft can draw fluid through the evaporator and over the motor body. The regulator throttles a suction line from the evaporator when the temperature falls to a preset level. An oil cooler may be included in order to keep discharge temperature to acceptable levels.

In preferred embodiments the refrigeration unit may be operated in heat pump modes, which means reverse cycle, as is understood in the industry, in order to heat the jacket for rapid thawing of the ice plug. Alternately, the jacket may incorporate electrical heaters into the assembly. The compressor of preferred embodiments may be driven by a hydraulic motor. When hydraulically driven, the exhaust from the motor may be used as condensing media. The evaporator of preferred embodiments may be constructed from flexible lines in order to fit irregular shapes. The evaporator assembly may also incorporate pipe wall temperature sensors SS, connected by line SL to a unit control system and/or acoustic sensing devices AS. See FIG. 2. Acoustic devices sense and transmit the sounds made by forming ice crystals. The pattern of sounds can be correlated with plug formation model data to sense the growth and condition of the plug and predict the stages of the formation of the plug.

The jacket may be so constructed as to facilitate installation by remotely operated vehicles. Automatic release of subsea umbilicals may be incorporated into the design. The refrigeration plant may be positioned off the pipe and connected by flexible lines, while retaining the proximity of the refrigeration unit to the jacket. The jacket may be designed so that it can be closed by hydraulic actuators 26 if necessary. See FIG. 9A.

The method and apparatus of the present invention is designed to freeze pipes of up to at least approximately 48 inches in diameter, and larger, achieving a high rate of heat transfer. A rate of heat transfer is primarily a function of pipe diameter, ice thickness and jacket delta temperature. The method and apparatus is capable of operating at depths in excess of 1,000 feet. It affords simple and practical operation and installation with an ability to accurately control pipe surface temperature, such as to a minimum temperature of −50° C., or to −65° C., as examples. Such achieves an economy by eliminating the complication and inefficiency of a secondary working fluid. A further advantage of the invention comprises low capital and operating costs.

Figure 10:
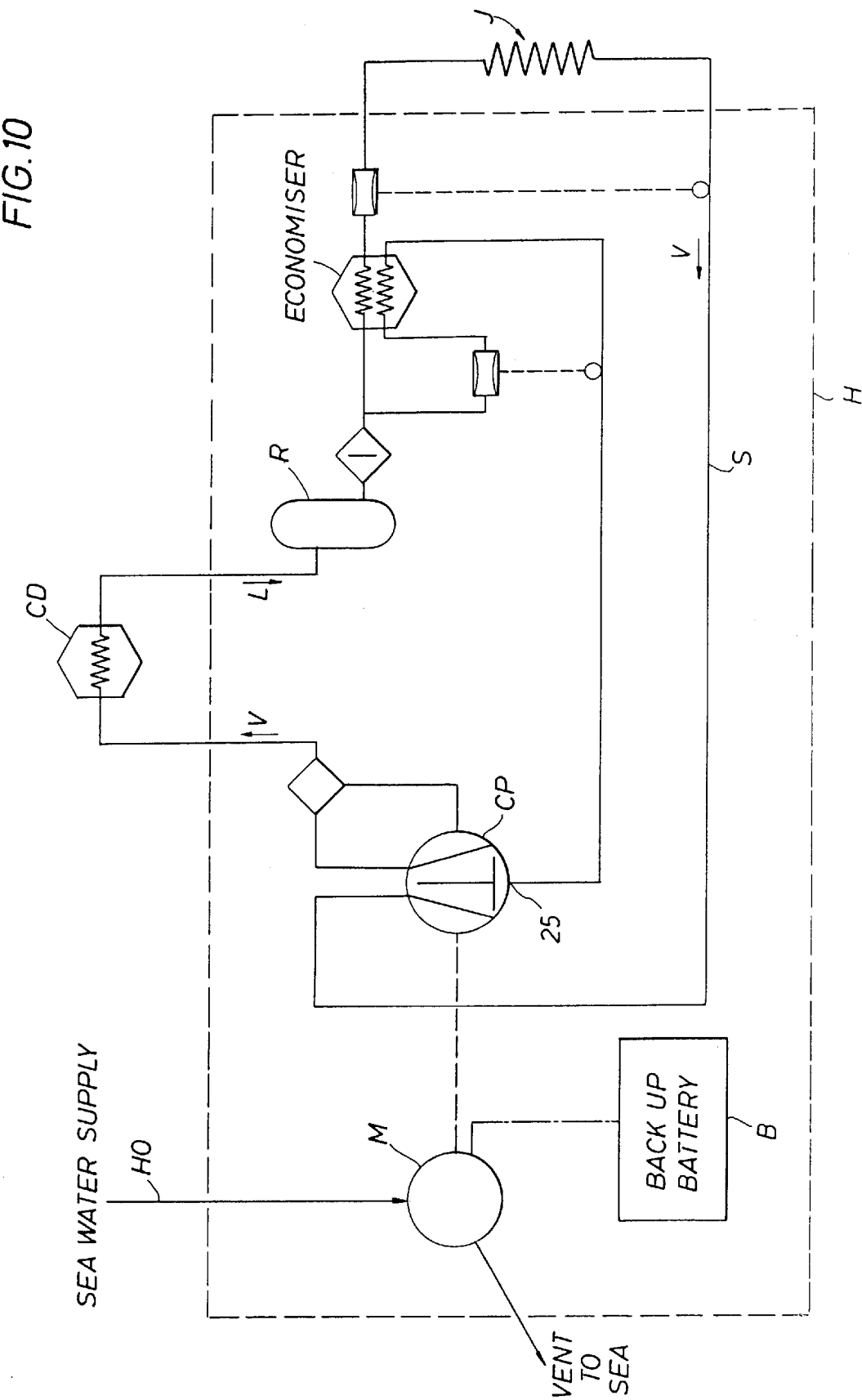
FIG. 10 illustrates schematically a refrigeration unit of a preferred embodiment with indication of location of parts with respect to a subsea pod housing.
Figure 11A:
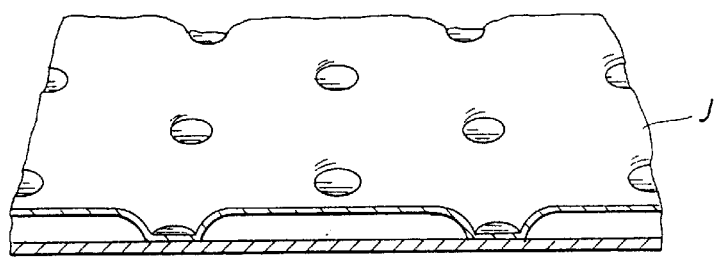
FIG. 11 illustrates possible structure for an evaporator pipe jacket.
Figure 11B:
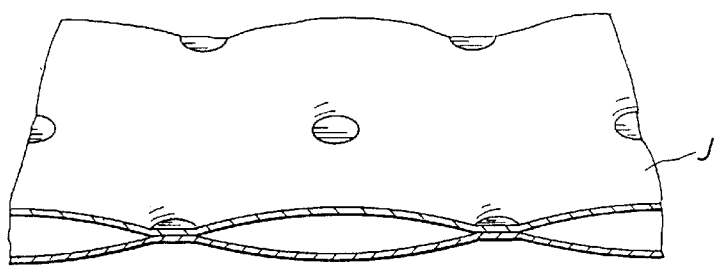
Figure 11C:
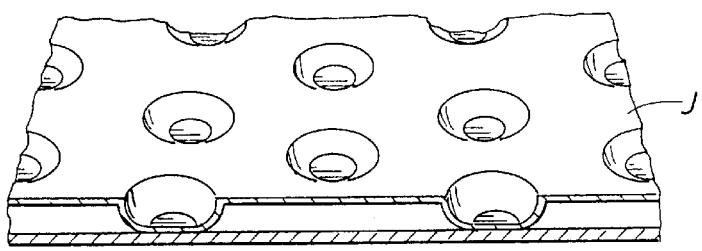
Figure 11D:
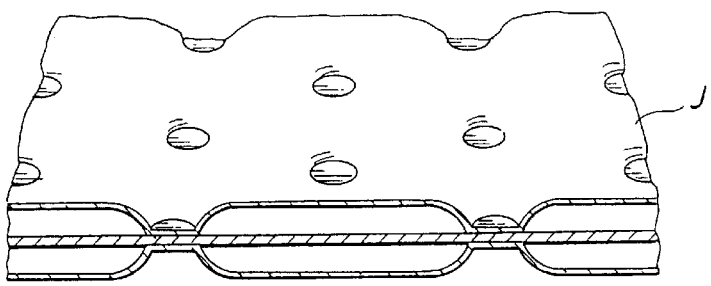
Figure 11E:
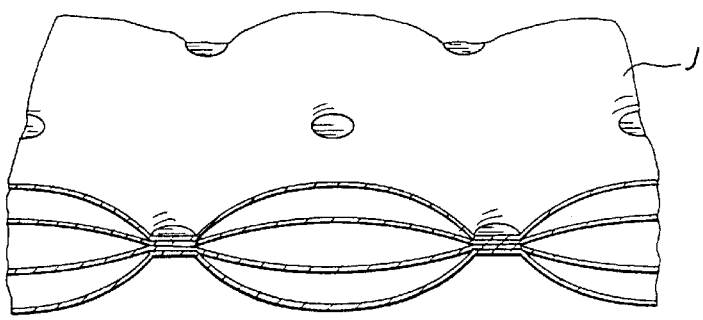

As illustrated in FIG. 10, the method and apparatus of an embodiment may include motor M. Motor M is preferably hydraulic. A seawater supply can be used to power the motor, and the motor can vent to the sea. The motor will be located within the subsea pod H comprising the submersible housing. The apparatus may further include a hydraulically driven condensing unit CD within the submersible housing. The condensing unit connects to an exterior pipe jacket J functioning as the evaporating chamber of the recycling refrigeration unit. In preferred embodiments the condenser of the recycling refrigeration unit is located exterior to the submersible housing, thereby being cooled by the ambient water. A controlled system will communicate with remotely located users to control and maintain the temperature of the pipe surface. The control system and preferred embodiments may include an electrical umbilical connector.

In one embodiment the refrigeration unit comprises a water cooled hydraulically driven condensing unit running on a refrigerant such as Forane FX 10 or R 502.

In order to minimize the size of some units, a single-stage vane type compressor CP with economizer port 25 may be selected. A remote hydraulic pump, such as on a surface vessel, may supply the condensing unit drive motor with high pressure water, such as sea water, via a single hose HO. See FIG. 10. No fluid return line is necessary as the sea water can be vented directly at the pod. The hose can be sufficiently flexible to withstand significant vessel heave and be reusable. Pipe jacket temperature can be accurately controlled by either varying the pump flow rate, which determines compressor speed, or by limiting the evaporating pressure with the regulator.

The apparatus of the present invention offers an environmentally friendly system with no pollution potential nor unusual hazard to personnel. The low thermal mass and high efficiency of the system result in a rapid jacket pull-down, saving time. The system is easier to install on pipe than other industry common systems since the system does not entail bulky hoses. The supply hose HO of the present system would comprise approximately only 10% of the cost of the composite insulated hoses currently employed in the cryogenic industry. Furthermore, only half as much hose would be required, as no return line would be necessary and the hose is reusable. The present invention makes it practically possible to provide a 100% backup at the location for all active refrigeration components. Power backup can be provided with batteries. Furthermore, the apparatus of the present invention can be designed to operate at depths in excess of 1,000 m.

Preferred embodiments of the present invention may also utilize thermal panels for the construction of the jacket. Thermal panels provide a highly developed heat transfer surface commercially available in a variety of double and multi-wall forms. The high surface-to-volume ratio of thermal panels result in preferred heat transfer characteristics.

Figure 4:
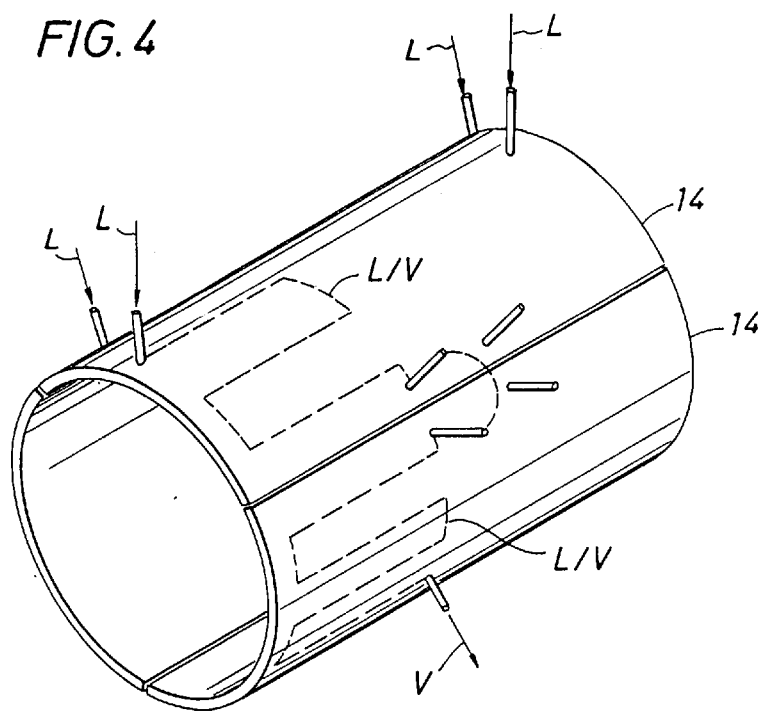
FIG. 4 illustrates structural elements of an evaporator jacket.

FIG. 11 illustrates possible and commercially available configurations, design and structure for evaporator pipe jacket J in order to maximize heat transfer and heat transfer surfaces. FIGS. 4 and 5 illustrate other possible embodiments for the interior structure of a jacket J, embodiments defining an interior baffled path for the liquid/vapor. It is preferable that the liquid/vapor L/V pursue a circuitous route through the jacket comprising the evacuation chamber to optimize heat transfer. FIG. 5 illustrates baffling B in evaporator 14, baffling B being indicated by dashed lines, which baffling defines a circuitous route in FIG. 5 for the refrigerant.

The foregoing disclosure and description of the invention are illustrative and explanatory thereof. Various changes in the size, shape and materials as well as the details of the illustrated construction may be made without departing from the spirit of the invention.

What is claimed is:

1. Apparatus for freezing a subsea large pipe plug, comprising:

a jacket adapted to encircle a section of large diameter pipe and defining an enclosed evaporation chamber that encircles said pipe;

a recycling refrigeration unit connected to said jacket and including a compressor in fluid communication with said evaporation chamber wherein said unit and said chamber are structured in combination to define a path of fluid communication such that a refrigerant recycles between said compressor and said chamber; and a subsea submersible housing including a pressure vessel enclosing at least a portion of said refrigeration unit.

2. The apparatus of claim 1 that includes insulation around said pipe adjacent said jacket.

3. The apparatus of claim 1 wherein said jacket has a length of at least one and one half times said pipe outside diameter.

4. The apparatus of claim 1 wherein said jacket defines an evaporation chamber having a baffled interior fluid passageway and provides a wall between the fluid and the pipe.

5. The apparatus of claim 1 wherein said jacket includes vinyl insulation.

6. The apparatus of claim 1 wherein said jacket is adapted to encircle said pipe such that sea water occupies space between said jacket and said pipe.

7. The apparatus of claim 1 wherein said refrigeration unit includes a single stage compressor.

8. The apparatus of claim 1 wherein said jacket defines an evaporation chamber having a generally cylindrically shaped interior wall and wherein at least portions of said wall contact portions of said pipe surface.

9. The apparatus of claim 1 that includes batteries located subsea and attached to said refrigeration unit.

10. The apparatus of claim 1 that includes means for controlling the operation of said refrigeration unit connected to said unit in order to control a pipe surface temperature.

11. The apparatus of claim 10 that includes a submersible ice plug growth and closure monitoring device in communication with said control means.

12. The apparatus of claim 1 wherein said refrigeration unit includes a condenser, portions of said condenser being attached outside of said pressure vessel, and where in said refrigeration unit is located proximate said jacket.

13. The apparatus of claim 1 wherein said refrigeration unit includes means for cycle reversal.

14. Apparatus for freezing a subsea large pipe plug, comprising:
   a jacket adapted to encircle a section of large diameter pipe;
   a recycling refrigeration unit having said jacket connected as an evaporation chamber;
   a subsea submersible housing enclosing at least a portion of said refrigeration unit; and
   wherein said refrigeration unit includes a heat exchanger in cooling contact with said submersible housing atmosphere.

15. Apparatus for freezing a subsea large pipe plug, comprising:
   a jacket adapted to encircle a section of large diameter pipe;
   a recycling refrigeration unit having said jacket connected as an evaporation chamber;
   a subsea submersible housing enclosing at least a portion of said refrigeration unit; and
   wherein said refrigeration unit includes a sub-cooling cycle.

16. A method for freezing a subsea pipe plug, comprising:
   enclosing at least a portion of a recycling refrigeration unit including a compressor in a pressure vessel of a subsea submersible housing;
   landing the recycling refrigeration unit under sea water near a portion of pipe;
   surrounding said portion of pipe with a jacket, said jacket defining an enclosed evaporation chamber of said refrigeration unit, the chamber encircling said pipe; and
   recycling refrigerant through said unit including said compressor and said evaporation chamber.

17. The method of claim 16 that includes reversing the cycling of said refrigerant through said unit and said jacket.

18. The method of claim 16 that includes communicating power by a line through water between said refrigeration unit and a remote power source.

19. The method of claim 16 that includes communicating control information by a line through water between said refrigeration unit and a remote location.

20. The method of claim 16 that includes attaching said refrigeration unit to said pipe proximate said jacket.

21. The method of claim 16 that includes insulating a section of said pipe adjacent said jacket.

22. The method of claim 16 that include powering said unit by a subsea battery.

23. The method of claim 16 that includes contacting said pipe surface with at least a portion of said jacket.

24. The method of claim 16 that includes controlling the operation of said refrigeration unit in order to control a pipe section temperature.

25. The method of claim 24 that includes collecting acoustic data from said pipe adjacent said jacket.

26. The method of claim 24 that includes collecting pipe surface temperature data.

27. The apparatus of claim 1 wherein said refrigeration unit includes a multistage compressor.

28. The method of claim 16 that includes controlling at least one of the group consisting of rate of pipe freeze and temperature of pipe freeze by controlling at least one of the group of rate of operating of refrigeration unit, valving of refrigeration unit, refrigerant cycled, compressor size and number of compression cycles.

29. The method of claim 16 that includes landing said refrigeration unit proximate said portion of pipe and cooling atmosphere within said pressure vessel with said refrigeration unit.

30. Portable apparatus for freezing a large pipe plug, comprising:
   a jacket adapted to removably encircle a section of large diameter pipe and defining an enclosed evaporation chamber that encircles said pipe;
   a portable recycling refrigeration unit connected to said jacket and including a compressor in fluid communication with said evaporation chamber; and
   wherein said unit and said chamber are structured in combination to define a path of fluid communication such that a refrigerant recycles between said compressor and said chamber.

31. The apparatus of claim 30 wherein said evaporation chamber defines a baffled interior fluid passageway and provide a wall between said fluid and said pipe.

32. The apparatus of claim 30 wherein said jacket encircles a section of pipe of between 6 inches to 50 inches in outside diameter.

33. The apparatus of claim 30 wherein said jacket has a length of at least one and one half times said pipe's outside diameter and defines an evaporation chamber having a generally cylindrically shaped interior wall and wherein at least portions of said wall contact said pipe surface.

34. The apparatus of claim 30 wherein the refrigeration unit is located proximate to the jacket and that includes means for controlling operation of said refrigeration unit in order to control a pipe surface temperature.

35. The apparatus of claim 30 that includes insulation around said pipe adjacent said jacket.

36. The apparatus of claim 30 that includes a heat transfer compound layered between portions of said jacket and said pipe.

37. A method for freezing a pipe plug, comprising:
   locating a portable recycling refrigeration unit including a compressor near a section of pipe of at least 6 inches in outside diameter;
   surrounding a section of said pipe with a removable jacket defining an enclosed evaporation chamber of said refrigeration unit that encircles said pipe; and
   recycling refrigerant through said unit including said compressor and said evaporation chamber.

38. The method of claim 37 that includes reversing said cycle of said refrigerant through said unit and said evaporation chamber.

39. The method of claim 37 that includes insulating a section of said pipe adjacent said jacket.

40. The method of claim 37 wherein said jacket defines an evaporation chamber having a generally cylindrically shaped interior wall and that includes contacting said pipe surface with at least a portion of said wall.

41. The method of claim 37 locating the refrigeration unit proximate the section of pipe and that includes controlling the operation of said refrigeration unit in order to control a pipe section temperature.

* * * * *